(12) United States Patent
Wright

(10) Patent No.: US 9,193,081 B2
(45) Date of Patent: Nov. 24, 2015

(54) CHILD-SAFE, HAND, FRUIT CORER AND SLICER

(71) Applicant: Peter Wright, Parkville, MD (US)

(72) Inventor: Peter Wright, Parkville, MD (US)

( * ) Notice: Subject to any disclaimer, the term of this patent is extended or adjusted under 35 U.S.C. 154(b) by 158 days.

(21) Appl. No.: 13/951,541

(22) Filed: Jul. 26, 2013

(65) Prior Publication Data

US 2015/0030740 A1  Jan. 29, 2015

(51) Int. Cl.
- A23N 4/12 (2006.01)
- B26D 3/26 (2006.01)
- A47J 25/00 (2006.01)
- A47J 21/00 (2006.01)
- B26B 27/00 (2006.01)

(52) U.S. Cl.
CPC . B26D 3/26 (2013.01); A47J 21/00 (2013.01); A47J 25/00 (2013.01); B26B 27/002 (2013.01)

(58) Field of Classification Search
CPC ........ A23L 1/212; A23L 1/2125; A23N 4/12; A47J 21/00; A47J 25/00; B26D 3/26
See application file for complete search history.

(56) References Cited

U.S. PATENT DOCUMENTS

| | | | | |
|---|---|---|---|---|
| 1,960,651 A | * | 5/1934 | Swazey | 30/279.2 |
| 2,243,657 A | * | 5/1941 | Tachi | 7/158 |
| 2,252,094 A | * | 8/1941 | Palmer | 30/279.6 |
| 2,570,002 A | * | 10/1951 | McMillen | 30/279.6 |
| 3,505,731 A | * | 4/1970 | Giangiulio | 30/113.1 |
| 4,090,296 A | * | 5/1978 | Di Piero | 30/113.1 |
| 4,949,459 A | | 8/1990 | Noble | |
| 5,092,043 A | | 3/1992 | Shirkey | |
| D328,347 S | * | 7/1992 | Santora | D24/133 |
| 5,794,344 A | | 8/1998 | Poulos et al. | |
| 5,942,261 A | * | 8/1999 | Dreith | 425/458 |
| 6,199,283 B1 | * | 3/2001 | Bryant | 30/113.3 |
| 6,550,366 B2 | | 4/2003 | Ortega et al. | |
| 7,779,739 B2 | | 8/2010 | Peterson et al. | |
| 8,234,975 B2 | | 8/2012 | Holcomb et al. | |

FOREIGN PATENT DOCUMENTS

GB  288014  *  4/1928

* cited by examiner

*Primary Examiner* — Anthony Weier
(74) *Attorney, Agent, or Firm* — Larry J. Guffey; Oliver & Grimsley, LLC

(57) ABSTRACT

A child-safe, hand, fruit corer and slicer includes: handle, a wire member having two ends and a configuration between these ends that is adapted to: (a) provide the outline of: (i) a triangular-shaped structure that has three corners and a base that is situated approximately perpendicular to the handle's centerline, and (ii) a wing-like structure that extends perpendicular to the handle's centerline from each of the corners of the base of the structure, (b) enable the triangular-shaped structure to penetrate a fruit that is to be cored and sliced, and by the at least 180 degree rotation of the handle to core out a core section of the fruit, and (c) enable this wing-like structure to penetrate and slice the fruit into two halves when the handle is moved forward along the handle's centerline.

16 Claims, 4 Drawing Sheets

CHILD-SAFE, HAND, FRUIT CORER AND SLICER

BACKGROUND OF THE INVENTION

1. Field of the Invention

The present invention relates generally to cutlery and food cutting devices, and, more particularly to a hand cutlery device that can core and slice certain types of fruit in an especially safe manner.

2. Description of the Related Art

Many fruits come to retail consumers in a form that requires some additional, minimal preparation, other than cooking, before they are totally ready to be eaten. For example, strawberries usually are found in grocery stores in one- or two-pint baskets in which there are some leaves and part of the stem still attached to the berries. Additionally, strawberries, like many other fruits, have a core that is less edible, at least from a taste perspective, than the rest of the berry. Such cores are typically removed when one wishes to present strawberries in a form that the majority of people would probably find most appetizing. Slicing of de-stemmed and cored strawberries can also release the juices of the berries and further add to their appeal; as, for example, in a bowl of sliced strawberries.

A paring knife is probably the most commonly employed cutlery item used to remove the stem and core from a strawberry and to slice it. This method generally works well, but it has disadvantages. For example, it is time consuming and the sharp edge of the paring knife can present a safety hazard to its user.

Several specialized, hand-operated or hand devices have been disclosed for separating the outer meat of the strawberry from its stem and core. For example, U.S. Pat. No. 4,949,459 discloses a device including a tubular member attached to a handle. The tubular member is directed through the center of the strawberry until the stem and core are detached from the strawberry. Then the stem and core are pulled out of the tube. Successful operation of the invention depends on the stem not being separated from the core until after the stem has been pulled out of the tube. U.S. Pat. No. 5,092,043 discloses a strawberry stem/core remover including a tubular member mounted on a handle. The strawberry is pushed down over the free end of the tube which cuts through the strawberry and separates the core from the outer meat of the berry. The core being removed from a subsequent strawberry forces the core from a preceding berry through the tube toward an exit end of the core so that, when a sufficient number of berries have been cored, the cores from subsequent berries are forced out of the exit end of the core. Both of these specialized, hand devices cannot be used to slice a strawberry, so a paring or other knife would still have to be used for this task.

To make the task of removing the stem & core and then slicing strawberries less time consuming and safer, further improvements are needed in the cutlery devices now available for these tasks.

SUMMARY OF THE INVENTION

Recognizing the need for the development of an improved cutlery device for coring and slicing fruit, the present invention is generally directed to satisfying the needs set forth above and overcoming the problems and disadvantages exhibited by prior fruit corers and slicers.

In accordance with a preferred embodiment of the present invention, a child-safe, hand, fruit corer and slicer includes: (1) a handle having proximal and distal ends and a centerline that extends between these ends, (2) a first wire member having two ends and a configuration between these ends that is adapted to: (a2) provide the outline of: (i) a triangular-shaped structure that has three corners, a base and a prong extending from the corner that is located the furthest from the handle's distal end and wherein the base of this triangular-shaped structure is situated approximately perpendicular to the handle's centerline, and (ii) a first wing-like structure that extends perpendicular to the handle's centerline from each of the corners of the base of the triangular-shaped structure, (b2) attach the ends of the first wire member to the handle's distal end, (c2) enable the triangular-shaped structure of this first member to penetrate a fruit that is to be cored and sliced, and by the at least 180 degree rotation of the handle to core out a core section of the fruit and wherein the shape of this cored-out section is defined by the geometry of this triangular-shaped structure, and (d2) enable this wing-like structure of the first wire member to penetrate and slice the fruit into two halves when the handle is moved forward along the handle's centerline, and (3) a second wire member having two ends and a configuration between its ends that is adapted to: (a3) provide the outline of: (i) a second wing-like structure that extends perpendicular to the handle's centerline, (b3) attach the ends of this second wire member to the handle's distal end, and (c3) enable this second wing-like structure of the second wire member to further penetrate and slice each of the two halves of the fruit that were sliced by the first wing-like structures of the first wire member into two other halves so as to yield four slices of the cored fruit.

A first variant of this preferred embodiment is achieved when the first and second wire members have an AWG in the range of 8-20.

A second variant of this preferred embodiment is achieved when the configurations of the first and second wire members are further adapted for the coring and slicing of a strawberry.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
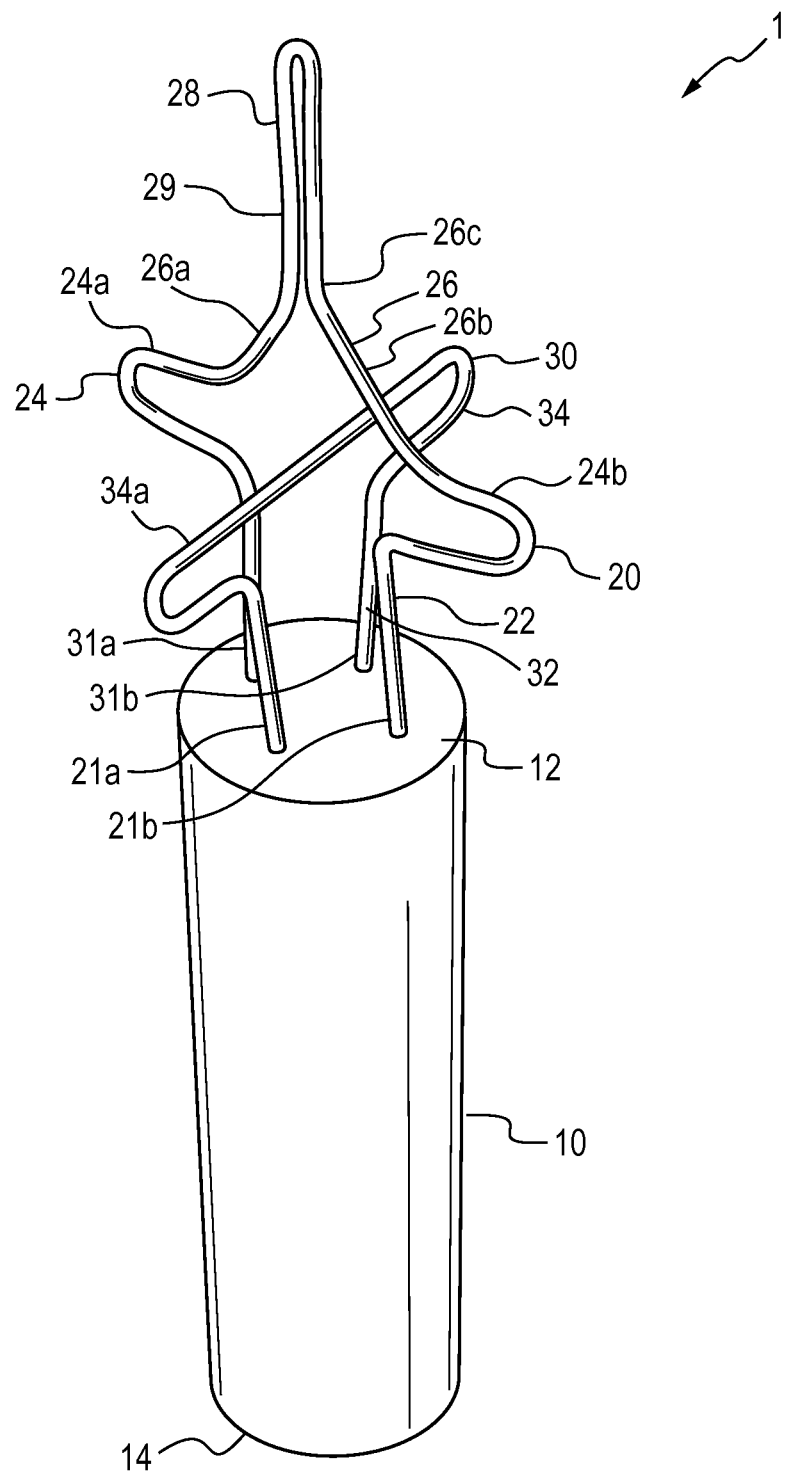
FIG. 1 is a perspective view of a preferred embodiment of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Referring to FIG. 1, there is illustrated a preferred embodiment of the present invention 1 which is illustrated in a perspective view. In this embodiment, the present invention takes the form of a child-safe, hand-operated or hand, fruit corer and slicer. It includes a handle 10 which is usually has a cylindrical configuration that is adapted so that the handle has a diameter and length that makes it easy for one to grasp it in one hand when using it. It is shown as a right, circular cylinder in FIG. 1, but its configuration could obviously take any one of a number of shapes (e.g., rather than being circular, the cross-sectional shape of the cylinder could be elliptical, square, polygonal, etc.). The handle also can be denoted as having a centerline 16 that extends between the cylinder's distal 12 and proximal 14 ends. Typical dimensions for this handle are in the range of: diameter equals 1-1.5 inches and length equals 3.5-5 inches, with preferred values of diameter equals 1.25 inches and length equals 4 inches.

A first planar member 20, preferably a wire member, is attached to the handle's distal 12 end. This member has multiple portions or planar sections, which are denoted as its base 22, slicer 24, corer 26 and spike, prong, rod or impaling 28 sections. Each of these has a configuration that is especially adapted to enable the section to perform its primary task. All of these sections and the entire first member share the common characteristic of being thin (i.e., if the member is a wire member, the gauge of the wire is small, e.g., an American Wire Gauge (AWG) in the range of 8-20, with a preferred 14 AWG or 0.0641 inches diameter, stainless steel wire) so that the edge 29 or outline of the member can serve as a blade for cutting or slicing, while providing the member with enough rigidity and strength so that it can hold its shape while sustaining the loads that are placed upon the device when it is in use.

We speak herein of this first member's sections as being planar sections since they are all so thin that a geometric description of them can be given by specifying only the shape of the outline that these sections make on the plane in which they effective lie. All these sections of the first member lie in the same plane. Thus, we sometimes refer to it as being a planar first member.

The base section 22 of the first member is configured for attaching the member to the handle's distal end 12. In its preferred form as a wire member, this section's two ends 21a, 21b are embedded at right angles into this distal end.

Figure 2:
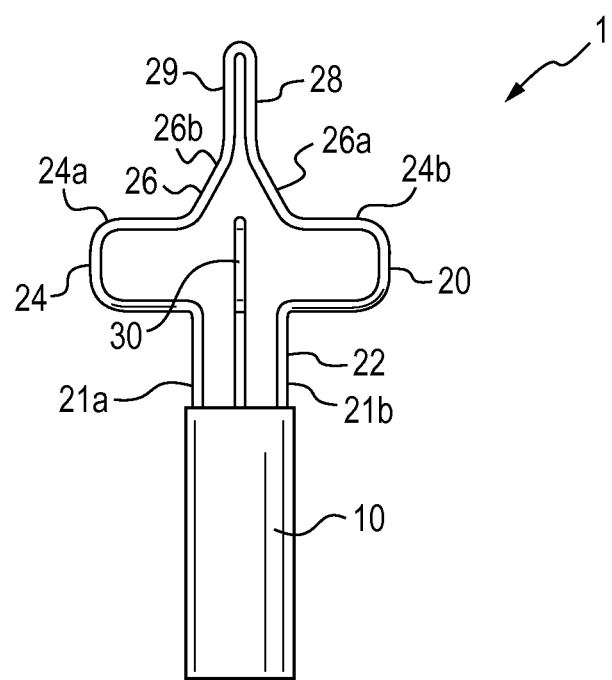
FIG. 2 is a front view of the cutlery device shown in FIG. 1
Figure 3A:
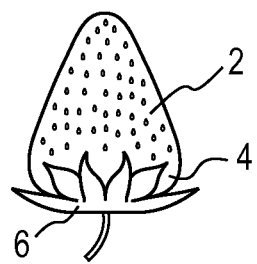
FIGS. 3A, 3B, and 3C show a strawberry at the various stages when it is being cored and sliced, with 3A showing an original strawberry, 3B showing a cored strawberry and 3C showing the end product, for this embodiment, of a strawberry that has been cored and sliced into four equal volumes.
Figure 3B:
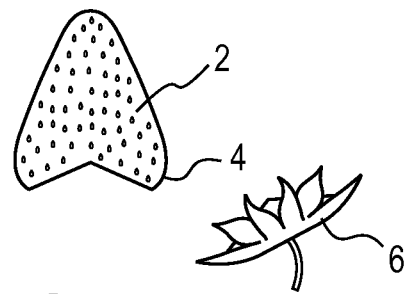
Figure 3C:
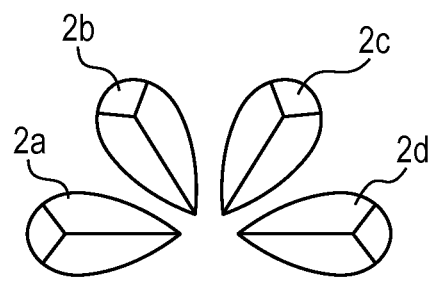

The corer section 26 has a configuration that is adapted to provide the outline of an isosceles triangular-shaped, blade-like structure whose shape determines what portion of the core of the strawberry or some other fruit is removed. The sides 26a, 26b of this triangle serve as the cutting blades for this section. The actual dimensions of this section can vary widely, e.g., the effective base of this isosceles triangle section can have a length of 0.5-1 inch and the equal included angles at the corners of this base are in the range of 45-75 degrees. See FIG. 2. For a strawberry 2, this core section will usually remove a portion of the strawberry's shoulder 4 and the leaves 6 that are attached to it, see FIG. 3A-3C.

This actual coring step occurs when the handle of this device is rotated 180 degrees so as to remove a conical section of the strawberry's core that is defined by the geometry or shape of this device's corer section. See FIG. 3B.

The spike, prong, rod or impaling 28 section, or prong, of the first member is configured for piercing a strawberry along the centerline of its core so that the desired section of the core can be removed by the present invention. It extends from the top 26c of the corer section. Its length will normally depend upon the depth of the fruit which is to be cored and sliced. For a strawberry, a typical length would be in the range of 1-2 inches.

The slicer 24 section of the first member is configured for slicing a strawberry along the plane that is defined by the thin width of the first member. The outline of this section has the appearance of two wing-like structures 24a, 24b, each of which extends perpendicular to the centerline of the handle 10 from one of the corners of the corer section of the device. The distance between the tips of these two wing-like structures is determined by the shape or approximate diameter of the fruit which is to be sliced. For a strawberry, this length will typically be in the range of 1.5 to 3 inches.

This actual slicing step occurs after the handle of the device has been rotated 180 degrees so as to remove the strawberry's core. To then slice the strawberry, the handle of the device is pushed forward along its centerline so as to cause the leading edges of the slicing section's wing-like structures 24a, 24b to pass through and divide the strawberry into what would be two halves if a second wire member were not a part of most of these devices. See FIG. 3B.

Since most people seem to prefer to have their fruit in four parts rather than in halves, a second wire member 30 is typically included as part of the present invention. Other such "second" wire members could of course be added to the device is one wanted to have their fruit in more than four parts (e.g., 6 or 8 parts). This second wire member has only a base 32 and a slicing 34 section. Again, both of these sections and the entire second member share the common characteristic of being thin so that the edge or outline of this second member's slicing section can serve as a blade for slicing.

Figure 4:
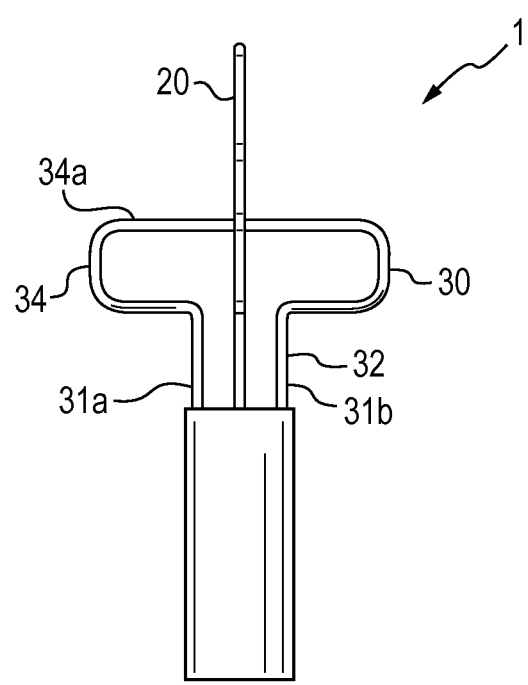
FIG. 4 is a side view of the cutlery device shown in FIG. 1

The base section 32 of the second member is configured for attaching the member to the handle's distal end 12. In its preferred form as a wire member, this section's two ends 31a, 31b are embedded at right angles into this distal end. When it is desired to slice the strawberry or any other fruit into four pieces having equal volumes, the location of these embeddings are chosen so that the plane that is defined by the thin width of the second member is perpendicular to the previously referenced plane that is defined by the thin width of the first member. See FIG. 4.

Above this base section 32 is located the slicer 34 section of the second member. It is configured for slicing a strawberry along the plane that is defined by the thin width of the second member. The outline of this section has the appearance of a wing-like structure 34a which extends perpendicular to the centerline of the handle 10 of the device.

When the handle of the device is pushed forward along its centerline, the leading edge of the second member's wing-like structure 34a passes through and further divides the strawberry into four cored, equal volumes, 2a-2d. See FIG. 3C.

The present invention has some unique features that are especially noteworthy. For example, when the members are wire members (e.g., AWG 14), the present invention is exceedingly safe to use since it presents essentially no cutting hazard to its user. This is due to the fact that the present invention has recognized that the density and lack of toughness of the outer layer of a strawberry are such that it is a very easy fruit to slice; thus, it can be sliced or cut with only a stiff, small diameter wire—a wire that poses practically no cutting threat to a human's skin, i.e., the present invention is safe for use by a child to whom one would not entrust a knife.

Additionally, the use of such a wire means that the actual volume or mass of the present invention is much smaller than it would otherwise be if its members were fabricated in a blade-like form by using thin sheets of stainless steel. This results in a substantial reduction in the amount of stainless steel material that must be used to fabricate the present invention and significant fabrication costs for the present invention.

The foregoing is considered as illustrative only of the principles of the invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereinafter set forth in the claims to the invention.

I claim:

1. A child-safe, hand, fruit corer and slicer comprising:
    a handle having a length and a centerline that extends between the proximal and distal ends of said handle,
    a first wire member having planar base, slicing, coring and impaling portions,
    wherein said planar base portion have a configuration adapted to attach said planar base portion to said distal end of said handle,
    wherein said planar slicing portion having a leading edge and a configuration adapted to enable said leading edge to slice said fruit along the plane that is defined by said planar slicing portion,
    wherein said planar corer portion section having a configuration adapted to provide the sides of a triangular-shaped structure whose shape determines what portion of the core of said fruit is to be removed, and
    wherein said planar impaling portion having a configuration adapted to enable said planar impaling portion to pierce said fruit along the centerline of the core of said fruit so that a desired section of said fruit core can be removed.

2. The child-safe, hand, fruit corer and slicer as recited in claim 1, further comprising:
    a second wire member having planar base and slicing portions,
    wherein said planar base portion of said second member have a configuration adapted to attach said planar base portion of said second member to said distal end of said handle, and
    wherein said planar slicing portion of said second member having a leading edge and a configuration adapted to enable said leading edge to slice said fruit along the plane that is defined by said planar slicing portion of said second member.

3. The child-safe, hand, fruit corer and slicer as recited in claim 1, wherein:
    said first wire member has an AWG in the range of 8-20.

4. The child-safe, hand, fruit corer and slicer as recited in claim 2, wherein:
    said first wire member has an AWG in the range of 8-20.

5. The child-safe, hand, fruit corer and slicer as recited in claim 1, wherein:
    said configurations of said planar base, slicing, coring and impaling portions further adapted for the coring and slicing of a strawberry.

6. The child-safe, hand, fruit corer and slicer as recited in claim 2, wherein:
    said configurations of said first member planar base, slicing, coring and impaling portions further adapted for the coring and slicing of a strawberry, and
    said configurations of said second member planar base and slicing portions further adapted for the slicing of a strawberry.

7. The child-safe, hand, fruit corer and slicer as recited in claim 3, wherein:
    said configurations of said planar base, slicing, coring and impaling portions further adapted for the coring and slicing of a strawberry.

8. The child-safe, hand, fruit corer and slicer as recited in claim 4, wherein:
    said configurations of said first member planar base, slicing, coring and impaling portions further adapted for the coring and slicing of a strawberry, and
    said configurations of said second member planar base and slicing portions further adapted for the slicing of a strawberry.

9. The child-safe, hand, fruit corer and slicer as recited in claim 2, wherein:
    said second wire member has an AWG in the range of 8-20.

10. The child-safe, hand, fruit corer and slicer as recited in claim 4, wherein:
    said second wire member has an AWG in the range of 8-20.

11. The child-safe, hand, fruit corer and slicer as recited in claim 6, wherein:
    said second wire member has an AWG in the range of 8-20.

12. The child-safe, hand, fruit corer and slicer as recited in claim 8, wherein:
    said second wire member has an AWG in the range of 8-20.

13. A child-safe, hand, fruit corer and slicer comprising:
    a handle having proximal and distal ends and a centerline that extends between said ends,
    a first wire member having two ends and a configuration between said ends that is adapted to: (a) provide the outline of: (i) a triangular-shaped structure that has three corners, a base and a prong extending from said corner of said triangular-shaped structure that is located the furthest from said handle distal end and wherein said base of said triangular-shaped structure is situated perpendicular to the centerline of said handle, and (ii) a first wing-like structure that extends perpendicular to the centerline of said handle from each of the corners of the base of said triangular-shaped structure, (b) attach said ends of said first wire member to the distal end of said handle, (c) enable said triangular-shaped structure of said first member to penetrate a fruit that is to be cored and sliced, and by the at least 180 degree rotation of said handle to core out a core section of said fruit and wherein the shape of said cored-out section is defined by the geometry of said triangular-shaped structure, and (d) enable said wing-like structures of said first wire member to penetrate and slice said fruit into two halves when said handle is moved forward along the centerline of said handle, and
    a second wire member having two ends and a configuration between said ends that is adapted to: (a) provide the outline of: (i) a second wing-like structure that extends perpendicular to the centerline of said handle, (b) attach said ends of said second wire member to the distal end of said handle, (c) enable said second wing-like structures of said second wire member to further penetrate and slice each of said two halves of said fruit that were sliced by said first wing-like structures of said first wire member into two other halves so as to yield four slices of said cored fruit.

14. The child-safe, hand, fruit corer and slicer as recited in claim 13, wherein:
    said first and second wire members having an AWG in the range of 8-20.

15. The child-safe, hand, fruit corer and slicer as recited in claim 13, wherein:
    said configurations of said first and second wire members further adapted for the coring and slicing of a strawberry.

16. The child-safe, hand, fruit corer and slicer as recited in claim 14, wherein:

said configurations of said first and second wire members further adapted for the coring and slicing of a strawberry.

* * * * *